United States Patent [19]

Iwatani et al.

[11] Patent Number: 5,741,418
[45] Date of Patent: Apr. 21, 1998

[54] FILTER CLOTH SUSPENDING APPARATUS IN FILTER PRESS

[75] Inventors: Akitoshi Iwatani, Marugame; Hiroichi Kawasaki, Sakaide, both of Japan

[73] Assignee: Ishigaki Company Limited, Tokyo, Japan

[21] Appl. No.: 632,510

[22] PCT Filed: Aug. 21, 1995

[86] PCT No.: PCT/JP95/01646

§ 371 Date: Jun. 17, 1996

§ 102(e) Date: Jun. 17, 1996

[87] PCT Pub. No.: WO96/05904

PCT Pub. Date: Feb. 29, 1996

[30] Foreign Application Priority Data

Aug. 23, 1994 [JP] Japan .................... 6-222518

[51] Int. Cl.[6] .................................... B01D 25/34
[52] U.S. Cl. ................... 210/225; 210/230; 100/198
[58] Field of Search ........................ 210/225, 229, 210/230, 237, 499, 249; 100/197, 198, 199; 384/192, 416, 444

[56] References Cited

FOREIGN PATENT DOCUMENTS

| 1242991 | 6/1967 | Germany ................... 210/499 |
|---|---|---|
| 18528 | 5/1980 | Japan . |
| 56-45642 | 10/1981 | Japan . |
| 22972 | 7/1985 | Japan . |
| 60-22972 | 7/1985 | Japan . |
| 168510 | 7/1987 | Japan ................... 210/225 |
| 1-37684 | 11/1989 | Japan . |
| 37684 | 11/1989 | Japan . |
| 2-261508 | 10/1990 | Japan . |
| 251209 | 10/1990 | Japan . |
| 39609 | 5/1993 | Japan . |
| 39904 | 5/1993 | Japan . |
| 5-39604 | 5/1993 | Japan . |
| 88606 | 12/1993 | Japan . |

*Primary Examiner*—Matthew O. Savage
*Attorney, Agent, or Firm*—Klarquist Sparkman Campbell Leigh & Whinston, LLP

[57] ABSTRACT

This invention relates to a filter cloth suspending apparatus in which a filter cake is produced by pressing sewage and waste water between filter cloths with filter plates, and the obtained cake is discharged. In the apparatus, an upper edge of the filter cloth (3) is supported on an upper supporting bar (13), on the other hand, a lower edge of the filter cloth is formed in a concave shape, and a suspending member (15) is connected to both corners (18, 20). Thus, the contact of the lower edge of the filter cloth with the upper supporting bar is prevented, and damage of the filter cloth is prevented. Further, sagging of the lower edge of the filter cloth is also prevented.

4 Claims, 7 Drawing Sheets

FILTER CLOTH SUSPENDING APPARATUS IN FILTER PRESS

TECHNICAL FIELD

The present invention relates to an improvement of a filter cloth suspending apparatus in a filter press in which a filter cloth suspended between filter plates is traveled and a filter cake produced between the filter cloths is discharged.

BACKGROUND ART

As a filter cloth suspending apparatus in a filter press, an example shown in FIG. 4 in Examined Patent Publication No. Sho.-55-18528 has conventionally been known. In the suspending apparatus, a pair of filter cloths are provided between filter plates, upper edges of the filter cloth are adhered to each other, an upper supporting bar for the filter cloth is inserted to the adhesion portion, a lower portion of the filter cloth is put around a guide roll and then fixed to a lower s supporting bar. Further, the upper and lower supporting bars are connected to the both ends of a driving chain latched around a sprocket of a driven shaft, and filter cloths are suspended on the upper and lower supporting bars. Further, bevel gears provided for the driving shaft and the driven shaft are engaged to each other to rotate so that the filter cloth is lifted by rotating the driving shaft.

In another suspending apparatus for the filter cloth shown in FIGS. 1 and 3 in Unexamined Patent Publication No. Hei.-2-261508, a chain wheel provided on an upper filter plate is slidably arranged on a driving shaft, and a driving chain for the filter cloth is latched around this chain wheel to suspend the cloth. Further, in another suspending apparatus for the filter cloth shown in FIG. 2 in Examined Patent Publication No. Sho.-58-45842, a lower portion of a suspended filter cloth is secured to a wind-up roll, the filter cloth is lowered by the wind-up roll, and the filter cloth is lifted with a drive wheel.

However, in the suspending apparatus providing the supporting bar on the filter cloth on the upper and lower sides thereof, as shown in the above mentioned Examined Patent Publication No. Sho. 55-18528 and Unexamined Patent Publication No. Hei 2-261508, when the filter cloth is drove to be traveled so as to discharge cakes produced between the filter plates, the upper supporting bar is lowered, and the lower supporting bar is lifted, and then, both of the upper and lower supporting bars are crossed to each other. And, at this crossing, the upper supporting bar is brought into contact with the lower supporting bar, and the supporting bars are apt to be bent, or the filter cloth is apt to be broken, by a clinging condition of the cake to the filter cloth. It is necessary to widen or open the space or distance between the filter plates to prevent this interference. However, when the space is widened, the number of the filter cloths per unit area is reduced, and consequently, the filtration area of the apparatus is also reduced. Thus, in order not to widen the space between the filter plates, strong and thin supporting bars has conventionally been used. Nevertheless, it is actually difficult to completely avoid the contact. Thus, one side of the pair of cloths provided between the filter plates is regulated by a guide roll, positioned under the filter plates, and adjacent to the driving shaft or the driven shaft positioned above the filter plates, and the filter cloths are inclined at widening the space between the filter plates (hereinafter referred to as an opening of the filter plates). Further, when the filter cloths are traveled, a string-shaped driving means comes into contact with the filter cloths to generate abrasion, thereby shortening a life for the filter cloth. Since the drive wheel is put between bearings provided above the filter plates, a frictional resistance is generated between the bearing and the driving shaft at the opening of the filter plates, which results in abrasion of the driving shaft and bearing. Additionally, in the apparatus in which the filter cloth is wound, as shown in the above-mentioned Examined Patent Publication No. Sho.-58-45642, when the filter cloth is clogged, the diameter of the wind-up roll is changed in the width direction thereof, and a wrinkle is apt to be produced. This invention provides a filter cloth suspending apparatus in which the contact of the filter cloth with the supporting bar, or the damage and abrasion of the filter cloth or the like is reduced, and an opening/closing resistance of the filter plate is also reduced. In this case, the "opening" means widening the space between the filter plates, and the "closing" means closing the space between the filter plates.

DISCLOSURE OF INVENTION

The gist of this invention resides in that in a filter press wherein a number of filter plates are arrayed in parallel on guide rails in a manner that they can freely be opened or closed, a pair of filter cloths are provided between these filter plates, an upper edge of the filter cloth is connected to one end of a driving means, which is wound around a drive wheel mounted above the filter plate, a lower edge of the filter cloth put around a guide roll is connected to the other end of the driving means in a manner that the filter cloth can freely be lifted or lowered; an upper supporting bar is provided on the upper edge of the filter cloth, a central lower edge of the filter cloth is cut out to form a central concave portion while leaving both side edges, and both edges of the upper supporting bar and both corners of the filter cloth lower edge are connected to the driving means respectively.

The connection of said filter cloth to a string-shaped driving means will now be described in detail. It is preferable that a bag portion is provided for the both corners of the filter cloth with the central concave portion, a triangular suspending metal is inserted into this bag portion, and the lower edge of the suspending metal is connected to the driving means for the filter cloth. Further, It is also preferable that bag portions are formed at the lower edge and the left and right lower side edges of the filter cloth with central concave portion, a string-shaped body is inserted into these bag portions, both ends of the string-shaped body are secured to the filter cloth respectively, and the driving means for the filter cloth is connected to both lower corners of the filter cloth. Further, when a guide rod is provided along said both side walls of the filter cloth, and a tension ring is engaged with the guide rod with a play, and then said both corners of the filter cloth are secured to the tension ring, a zigzag movement of the driving means for the filter cloth can be regulated.

Further, a supporting mechanism for the drive wheel around which a string-shaped driving means was put will now be described in detail. A drive wheel slidably provided on the driving shaft arranged above the group of said filter plates is movably supported on a supporting rod arranged above the filter plate, and a portion around which the driving means for the drive wheel is wound is provided on a side of opening direction of filter plate.

The filter cloth suspending apparatus according to this invention is constructed in such a manner as described above. Thus, when the filter cloth is traveled between the filter plates, the contact of the upper supporting bar to the filter cloth does not occur at the crossing of the upper supporting bar arranged above the filter cloth and the lower edge of the filter cloth, whereby damage of the filter cloth or supporting member for the filter cloth can be removed. Further, the both corners of the filter cloth are engaged with guide rods provided along the side walls. Thus, when the filter cloth is traveled with the driving means, the filter cloth is regulated by the guide rod, and the filter cloth is lifted, while maintaining a regular distance to the guide rod. That is, the filter cloth suspending apparatus according to this invention prevents an approach of the driving means to inside, and a zigzag movement of the filter cloth. As a result, the driving means is not intervened between the filter plates at the opening of the filter plates. Furthermore, the filter cloth is always maintained in a stretching state, sagging and a wrinkle of the filter cloth can be prevented.

In the filter cloth suspending apparatus using triangular suspending metal to connect the filter cloth to the driving means, an inclined plane portion of the suspending metal which is drawn by the driving means is pressed on the lower edge and side edge of the filter bag portion, each cut out concave lower edge of the filter cloths is drawn in the left and right inclination directions, and then an action to draw both side edges of the filter cloths occurs in the vertical direction, whereby the filter cloths can be tensioned. Thus, since the triangular suspending metal is drawn while abutting against the filter cloth, a high strength can be obtained at the tensioned portion. Further, when a guide rod is provided along a side wall of the filter cloth and the suspending metal is engaged therewith, the filter cloth can be always kept in tension. In a case where string shaped bodies are inserted into the lower edge and the lower side edge, in place of the above-mentioned suspending metal, when the filter cloth is drawn by the string-shaped body, the central portion of the cut out lower edge to be sagged is tensioned by the string-shaped body, thereby generating a component of force in transverse and vertical directions. As a result, sagging of the filter cloth is prevented and a wrinkle derived from the sagging is not formed. Further, when this string-shaped body is engaged with a guide rod, approaching inside of the driving means and zigzag movement of the filter cloth can be prevented.

On the other hand, when the group of the filter plates are opened from a closed state, the side wall around which the driving means is hanged is traveled by pushing of a supporting rod to be shifted, while a boss portion of the drive wheel is put on the supporting rod provided above the filter plates, and the filter plates are stopped in an opened state. That is, the upper portion of the filter cloth suspended between opened filter plates is suspended by the drive wheel arranged near the back side filter plate, and the lower portion of the filter cloth is hung around a guide roll arranged under the front side filter plate. Accordingly, the driving means keeps a state of tension in a downward inclined direction. For this reason, when driving of the filter cloth is started, a force is acted in a downward inclined direction and the drive wheel is slid on a driving shaft. After that, the drive wheel is stopped at a position at which load of the filter cloth is decreased, between the filter plates. And, when the filter plates are closed, closing of the filter plates are started from the filter plate on the back side in the opening direction. That is, the drive wheel is pushed by a back side supporting rod, and closing of the filter plates can be completed in a state where the boss portion of the drive wheel is mounted on the supporting rod. At this time, although the filter plates are slid on the guide rail to travel while being inclined by the frictional resistance, the boss portion of the drive wheel is mounted on the supporting rod only. Thus, the filter plates do not interfere the movement of the drive wheel, and the drive wheel and the filter plates are not damaged.

BEST MODE FOR CARRYING OUT THE INVENTION

The best mode according to this invention will now be described with reference to the drawings.

Figure 1:
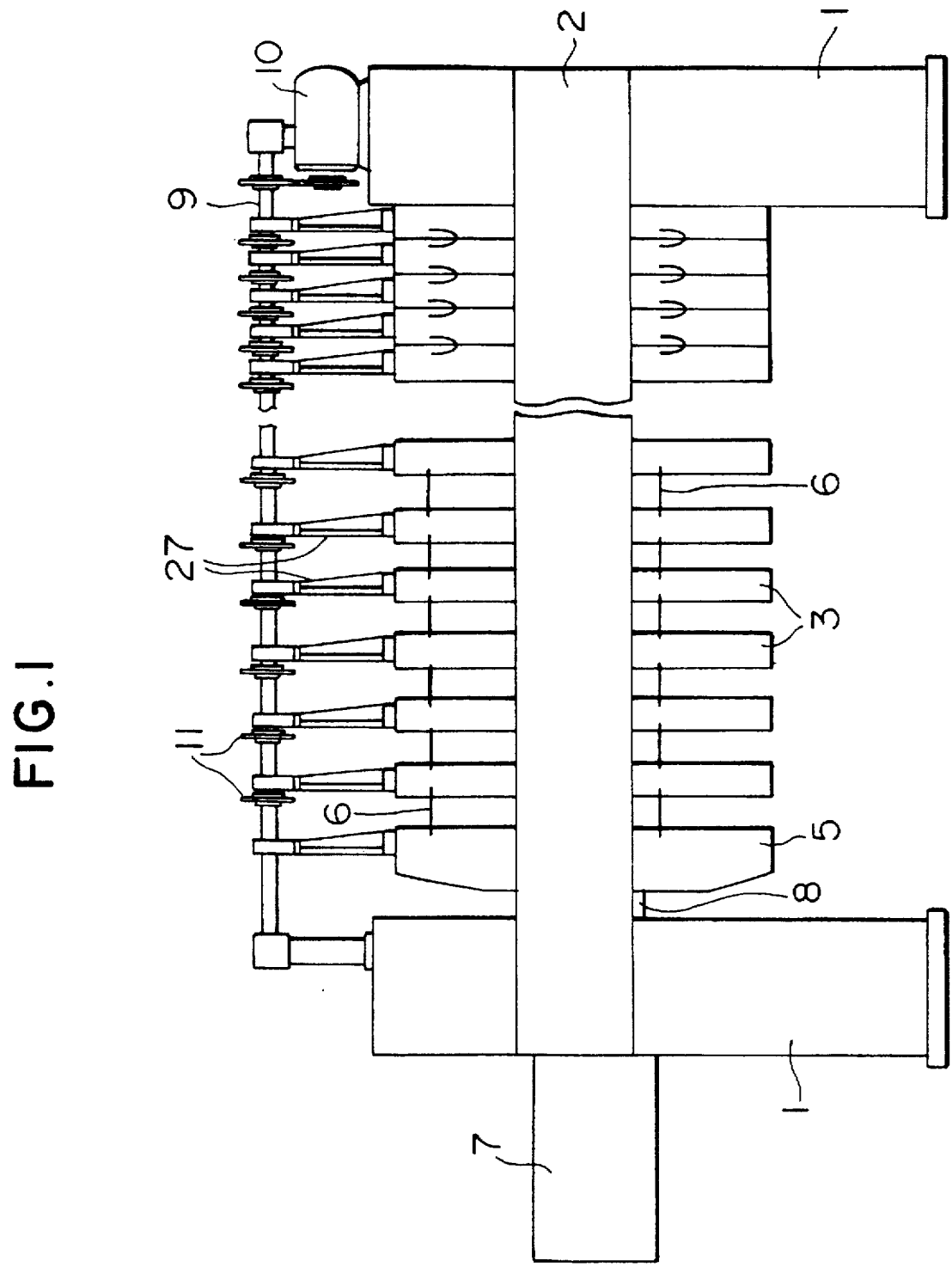
FIG. 1 is a schematic side view of a filter press according to the present invention, and shows a state where filter plates are opened on the left side, and a state where filter plates are closed on the right side.
Figure 3:
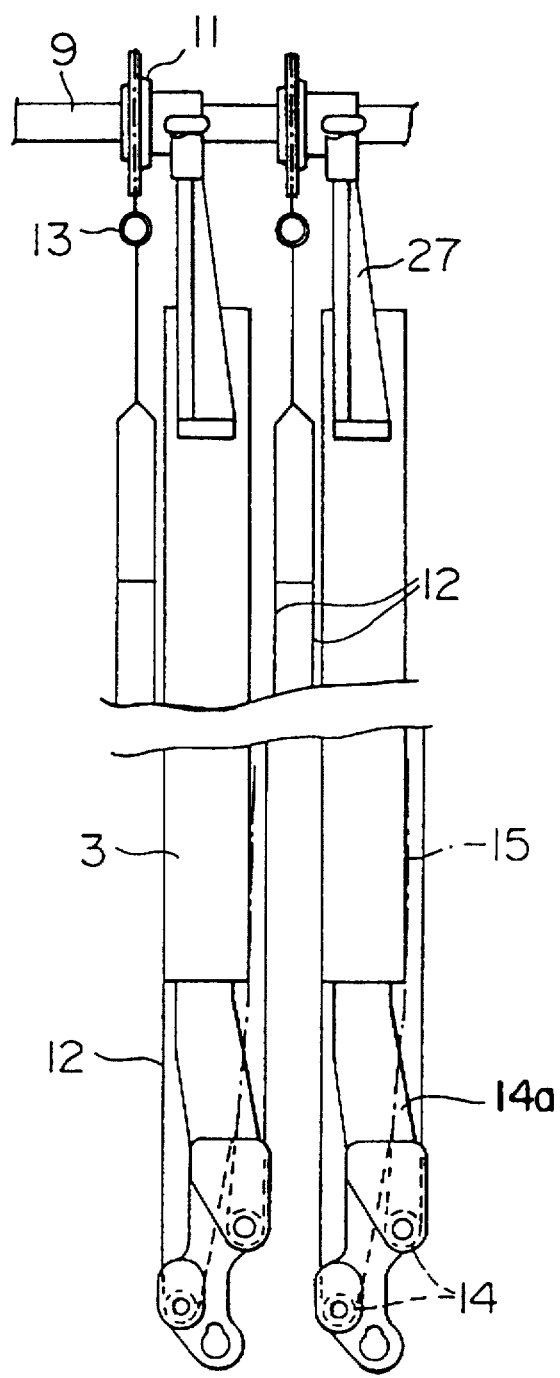
FIG. 3 is a side view showing a state where a filter cloth is suspended between the filter plates, according to the present invention.
Figure 7:
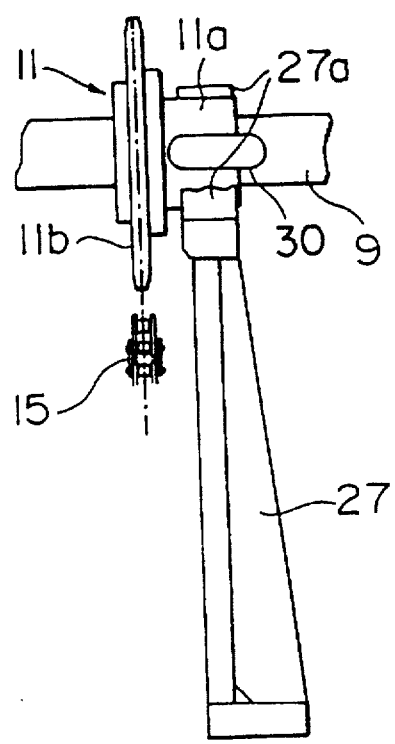
FIG. 7 is a partial sectional view showing a case where a drive wheel is mounted on an upper bracket for a filter plate, according to the present invention.

FIG. 1 is a schematic side view of a filter press according to the present invention, and shows a state where filter plates are opened on the left side, and a state where filter plates are closed on the right side. Reference numeral 1 denotes a pair of frames, and reference numeral 2 denotes a guide rail bridged between both frames i and 1, which is bridged at both sides of the frames 1 and 1. Reference numeral 3 denotes a number of filter plates movably arrayed in parallel, the filter plates can be traveled in the left and right direction in FIG. 1. These filter plates 3 are supported by means of filter plate arms 4 and 4 arranged at both upper side walls. These the filter plates 3 are connected to each other by means of chains 6 which control the space between the filter plates to a required distance or less, and a movable head is connected to one side of the filter plates group by means of chains 6 in the same manner. Reference numeral 7 denotes a hydraulic cylinder supported by a frame 1. A piston 8 of the cylinder is connected to the movable head 5. When the piston 8 is advanced, the movable head 5 presses the group of the filter plates 3 from the left side so as to sequentially move them in the right direction. Thus, the group of the filter plates 3 forms a state of closing the filter plates, as shown on the right side in FIG. 1. On the contrary, when the group of the filter plates 3 is closed, the piston 8 is backed. Then, the movable head 5 sequentially draws the group of the filter plates 3, first, the filter plate 3 on the left side being drawn. After that a state of opening the filter plates is obtained as shown on the left side in FIG. 1. Reference numeral 9 denotes a pair of driving shafts supported at the both back portions of the frames 1 and 1. The driving shafts 9 are rotated forward and backward by a forward and backward motor 10. Reference numeral 11 denotes slide sprockets. Each slide sprocket 11 is mounted on the driving shaft 9, as shown in FIGS. 3 and 7. This slide sprocket 11 is slidable in the axial direction with respect to the driving shaft 9. However, relative rotation of the slide sprocket 11 around the driving shaft 9 cannot be carried out. In this example, a hexagonal driving shaft 9 is used.

Figure 2:
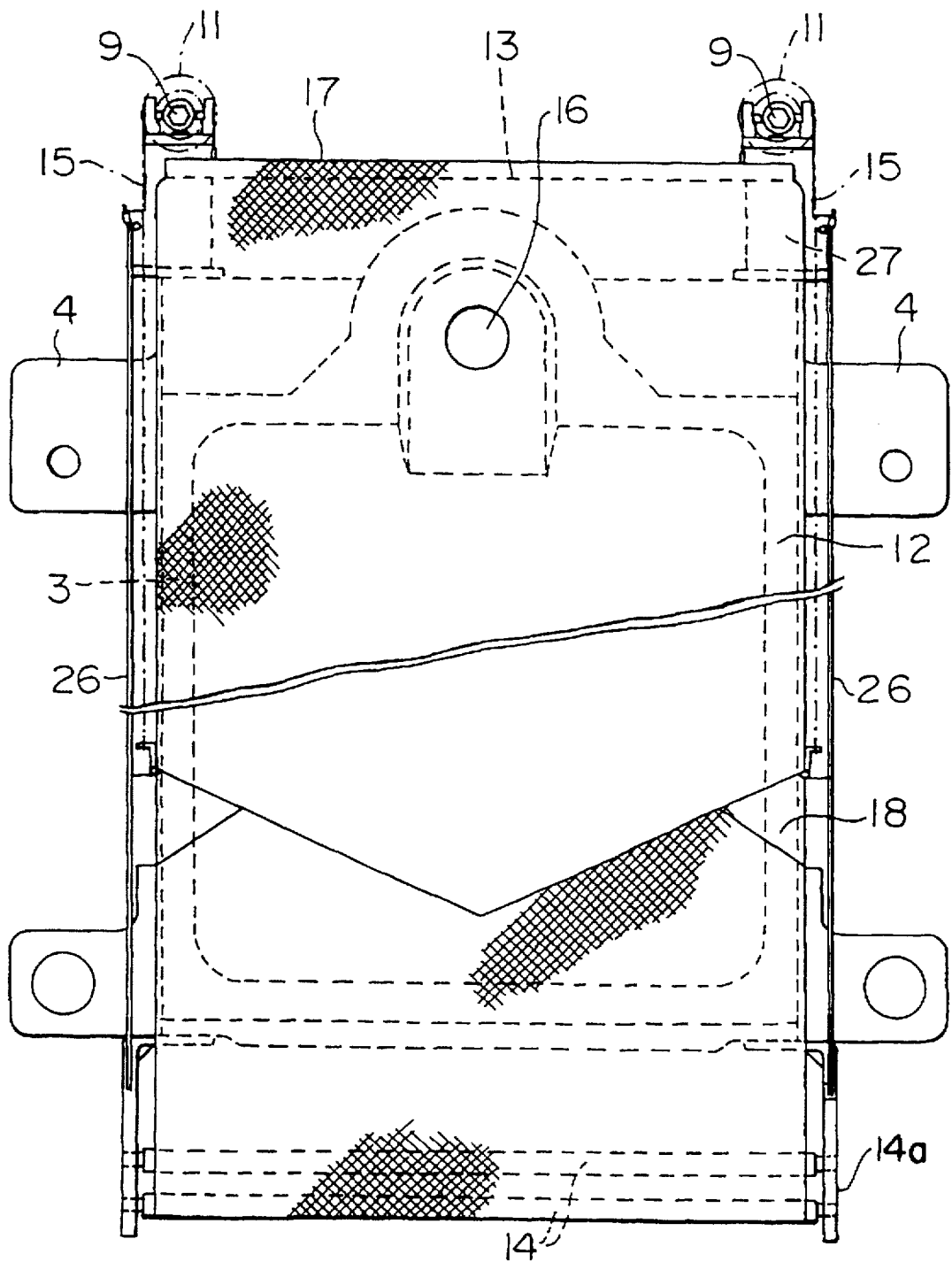
FIG. 2 is a front view showing a state where a filter cloth is suspended on the front side of the filter plate, according to the present invention.

A pair of filter cloths 12, 12 are provided between the above-mentioned filter plates 3, 3 as shown in FIGS. 2 and 3. This pair of filter cloths 12 and 12 are adhered to each other at the upper portions thereof, and attached to an upper supporting bar 13. A hanged down lower portion of the filter cloth 12 is put around a guide roll 14 arranged at the lower portion of the filter plate 3, and the lower edge of the filter cloth is adhered to that of another filter cloth 12 similarly arranged between the adjacent filter plates 3. On the other hand, a driving chain 15 is latched with the above-mentioned sprocket 11. One end of this driving chain is connected to the upper supporting bar 13, and the other end is connected to the lower edge of the filter cloth 12. And, when the driving shaft 9 is rotated, the slide sprocket is rotated so that the upper and lower portions of the filter cloth 12 are lifted or lowered as a seesaw. Further, reference numeral 16 denotes a supply opening for stock solution, provided for the filter cloth 12.

Figure 4:
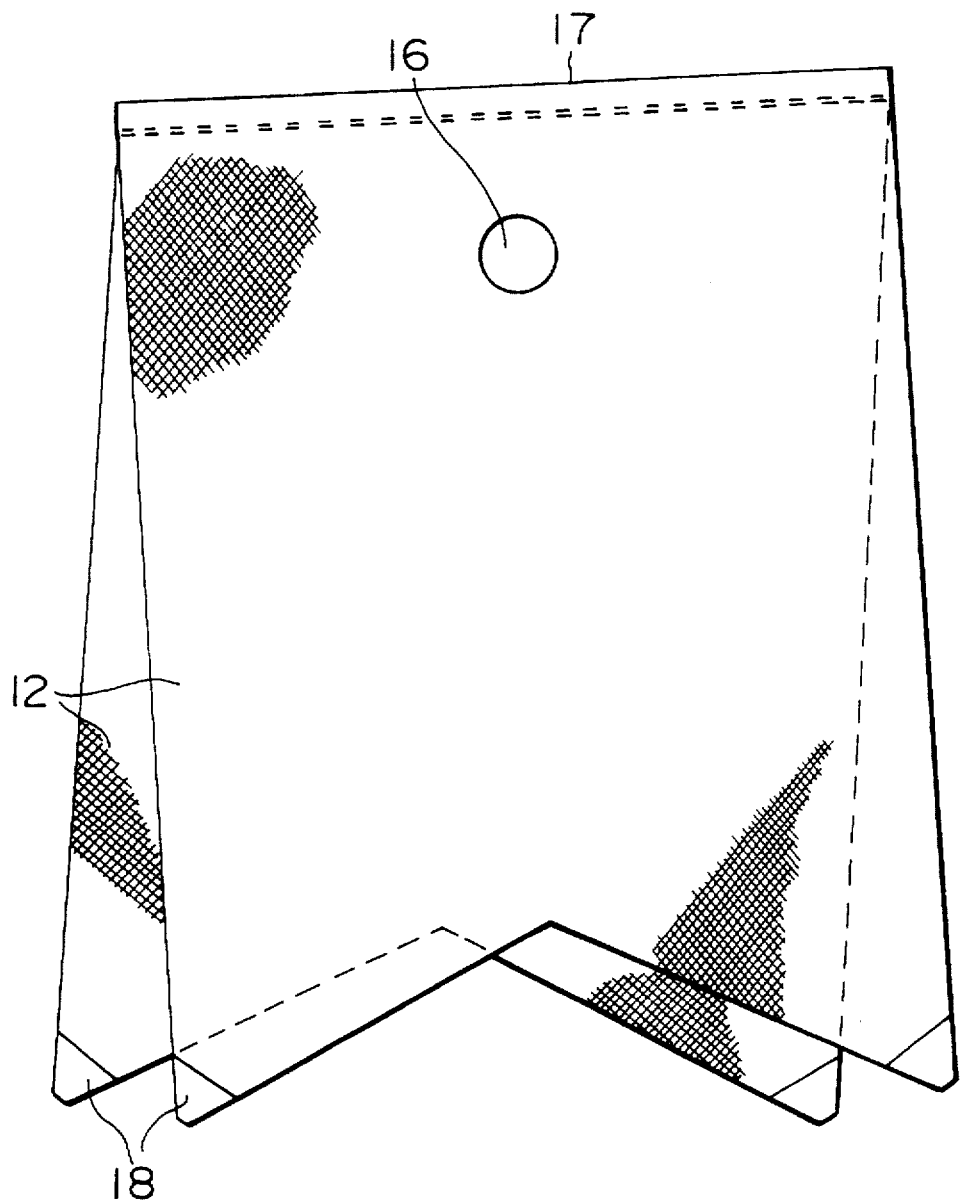
FIG. 4 is a schematic front view showing a state where a filter cloth is folded once, according to the present invention.
Figure 5:
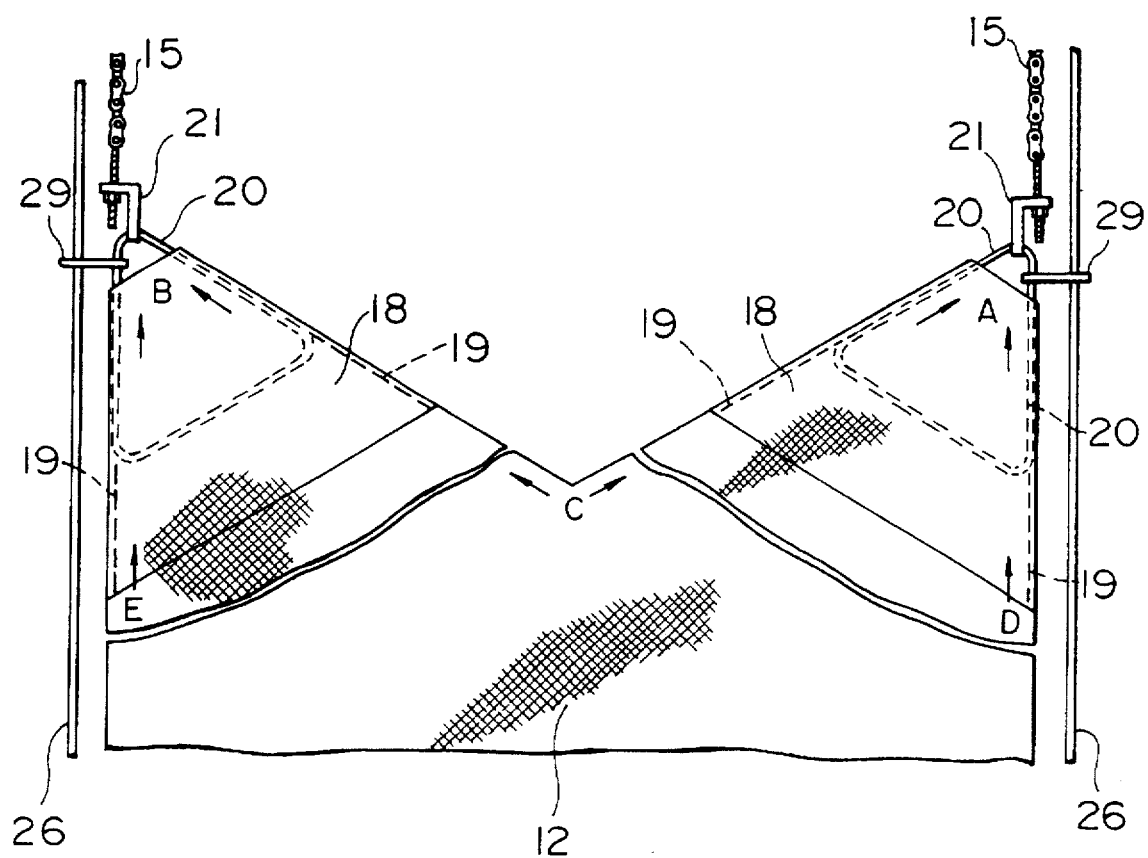
FIG. 5 is a front view of a suspending apparatus in which suspending metals are provided for the lower edge of a filter cloth having a concave portion, according to the present invention.

The suspended filter cloth described above will be described in detail. As shown in FIG. 4, the filter cloth 12 is formed by folding a rectangular filtration cloth. A mounting portion 17 of the upper supporting bar 13 is formed in the folded upper edge. The lower portion of the filter cloth 12 is cut out to form a central concave portion while leaving both side edges. The end portions of the driving chain 15 are attached to the both side edges of the upper supporting bar 13 inserted into the mounting portion 17 and to both corners of the lower edge of the filter cloth. Triangular bag portions 18 are respectively provided for the both lower edges of the filter cloth 12, as shown in FIG. 5. The bag portion 18 is formed in a bag-shape by sewing portions 19 and 19 formed in the lower edge and the side edge. The tip of the bag portion 18 is cut out. A triangular suspending metal 20 is inserted into the bag portion 18. The tip of the suspending metal 20 is protruded out of the cut out portion of the bag portion 18. The protruded tip of the supporting metal 20 is connected to the driving chain 15 with a connector 21. And, the suspending metal 20 tensions the filter cloth 12 while being supported by the sewing portions 19 and 19. The lower central edge (point C) of the filter cloth, provided with a central concave portion where sagging is apt to be formed, is tensioned in the left and right inclined directions (C→A, C→B directions). Further, the lower side edges of the filter cloth 12 are tensioned in longitudinal directions (D→A, E→B directions).

Figure 6:
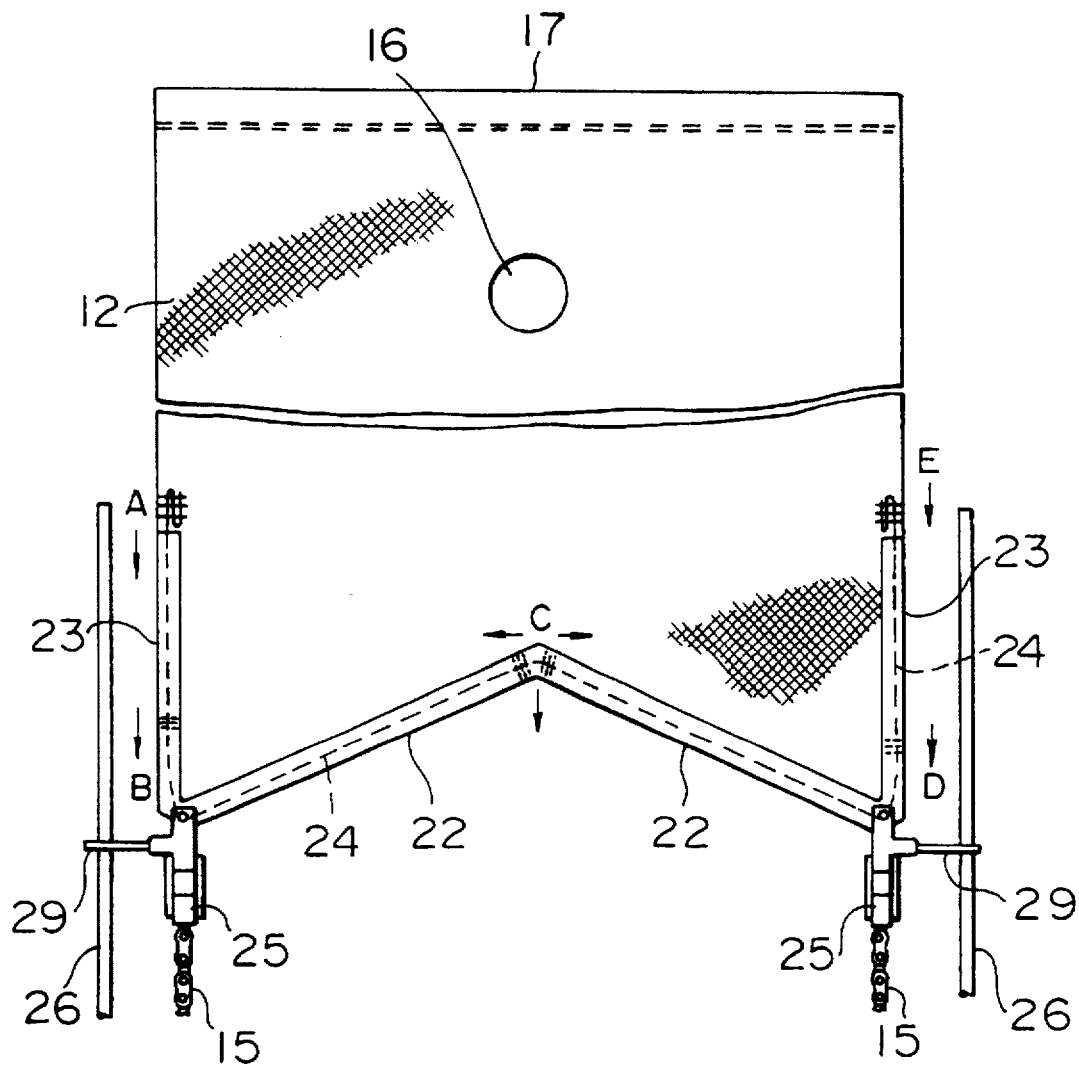
FIG. 6 is a front view of a suspending apparatus in which a string-shaped body is provided for the lower edge of a filter cloth, according to the present invention.

A filter cloth suspending apparatus shown in FIG. 6 is another example. In this example, a bag portion 22 is formed in a lower edge of the filter cloth 12 having a cut out concave portion, and bag portions 23 are formed in both lower side edges, both side tips B and D of the lower edge of the filter cloth 12 being cut out. And, a rope 24 is inserted into these bag portions 22 and 23. Both ends of the rope 24 are secured to the filter cloth 12 at upper portions (points A and E in FIG. 6) of the bag portions 23 and 23 arranged at the lower both side edges of the filter cloth 12, and the central portion of the rope 24 is secured to the filter cloth 12 at the concave center thereof (point C in FIG. 8). The rope 24 is connected to the driving chain 15 with a connector 25 at both cut out corners of the filter cloth (points B and D in FIG. 6). And, when the rope 24 is drawn with the driving chains 15, it is tensioned. Consequently, longitudinal directional (A→B) and transverse directional (E→D) components of force are acted at the rope 24 securing portions (points A and E) arranged at the lower both side edges of the filter cloth 12. Therefore, when the rope 24 is drawn at the both side corners (points B and D), the filter cloth 12 is tensioned so as to prevent sagging and a wrinkle. Further, the bag portions 22 and 23 providing a lower peripheral portion of the filter 12 functions as not only a guide of the rope 24, but also a reinforcement of the edge of the filter cloth.

Reference numeral 28 is a guide bar arranged along both side wall walls of the filter plate 3. As shown in FIG. 2, the guide bar 28 is supported by an upper bracket 27 vertically arranged at the upper portion of the filter plate 3 and a lower bracket 14a, hanged down to the lower edges of the filter plate 3, and providing the guide roll 14. To the guide bar 28 is fitted with a play a tension ring 29, as shown in FIGS. 5 and 6. In a case where the suspending metal 20 are arranged at both lower edges of the filter cloth 12, the tension ring 29 is engaged with this suspending metal 20. And, when the filter cloth 12 is lifted or lowered with the driving chain 15, the driving chain 15, the suspending metal 20 and the connector 21 are regulated with the guide bar 26, so as to be lifted or lowered along the guide bar 26. Accordingly, the filter cloth 12 is lifted or lowered while maintaining a regular space or interval with respect to the guide bar 26 so that the zigzag movement of the filter cloth 12 or the driving chain 15 is prevented. Further, when the driving chain 15 is lifted or lowered between the filter plates 3 and 3, the guide bar regulates a reaction force for sagging the driving chain 15. Therefore, by providing the guide bar 26, a wrinkle of the filter cloth 12, derived from sagging of the filter cloth 12, can be prevented, and at the same time, the zigzag movement of the filter cloth 12 or the driving chain 15 can be also prevented.

Figure 8:
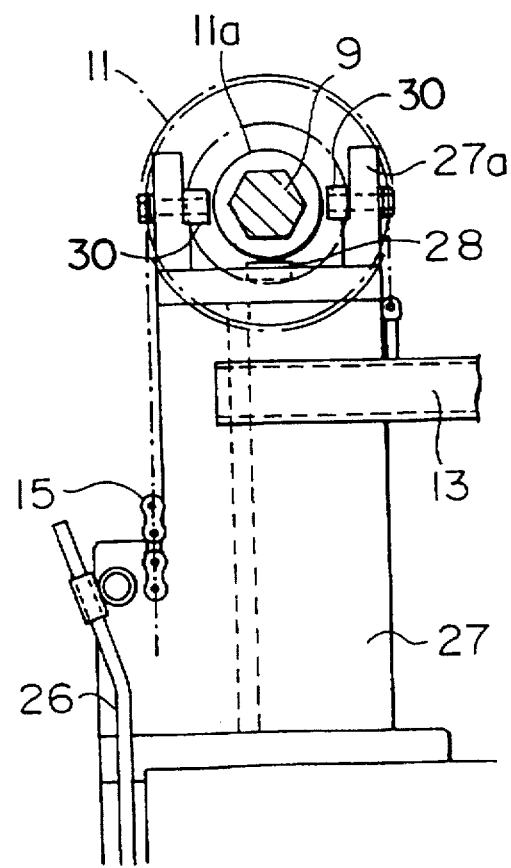
FIG. 8 is a front view showing a case where a drive wheel is mounted on an upper bracket, according to the present invention.

As shown in FIGS. 7 and 8, a concave supporting arm 27a is mounted on the upper bracket 27 vertically provided on the filter plate 3. This supporting arm 27a supports the boss portion 11a of the slide sprocket 11 with a seat 28. At the time of opening or closing the group of the filter plates 3, the slide sprocket 11 fitted to the driving shaft 9 can be freely moved upwardly or sideways with the respect to the upper bracket 27 of the filter plate 3. At the time of opening or closing the group of the filter plates, the filter plate 3 inclines to travel with inclination by sliding resistance between the guide rail 2 and the filter plate arm 4. Nevertheless, as the slide sprocket 11 is not fixed to the upper bracket 27 of the filter plate 3, it can be moved independently. Therefore, burning which is derived from friction resistance between the driving shaft 9 and the slide sprocket 11, and damage of the slide sprocket 11 or the filter plate 3, which is derived from over load can be prevented.

A pair of guide pins 30 are horizontally secured to both side walls of the supporting arm 27a of the upper bracket 27. These guide pins 30 are respectively arranged along the boss portion 11a of the slide sprocket 11 in a manner that the ends of the guide pins 30 extend from the respective supporting arm 27a. When the group of the filter plates 3 is closed, the guide pin 30 is traveled while pressing the side wall of the adjacent slide sprocket 11, so that movement of the filter plate being inclined can be prevented. And, the slide sprocket 11 is received in the upper bracket 27 of the filter plate 3 adjacent thereto in a closing direction, and at the same time, the filter cloth 12 is traveled to the intermediate position between the filter plates 3 and 3 with the guide pin 30, and catching of the filter cloth on the filter plate can be prevented at the start of lifting or lowering of the filter cloth. And, when the space or distance between the filter plates 3 and 3 is increased, namely the filter plates are opened, and the filter cloth is lifted or lowered, then, the slide sprocket 11 is tensioned with the driving chain 15 and moved to a position between the filter plates 3 and 3, where load is minimum, so that the filter cloth 12 can be lifted or lowered.

Since the apparatus of this invention is constructed as mentioned above, the filter cloth 12 does not come into contact with other elements when the upper portions of the filter cloths are crossed, and the filter cloth 12 to be sagged can be tensioned. Further, the drive wheel for lifting or lowering of the filter cloth 12 do not become resistance to the opening or closing of the filter plate and the traveling of the filter cloth 12. That is, in a conventional apparatus, when the filter cloth is lifted or lowered, the upper supporting bar is brought into contact with the lower supporting bar at the crossing thereof, whereby the filter cloth or the suspending apparatus is apt to be damaged. However, according to the present invention, a lower central edge and both side edges of the filter cloth, which are portions most likely to sag, are tensioned in an inclined direction and a longitudinal direction respectively, to tension the filter cloth. Accordingly, a wrinkle of the filter cloth and contact of the filter cloth with others at the crossing of the upper and lower portions of the filter cloths do not occur. Further, distance between opened plates can be reduced, and the traveling speed of the filter cloth can be increased. And, in a conventional apparatus, since a driving wheel meshed with a driving shaft is fixed to the upper portion of the filter plate, the drive wheel acts as resistance of the opening and closing of the filter plates. However, according to this invention, zigzag movements of the filter cloth and driving chain can be regulated by guide rods arranged along both sides of the filter plate. As a result, a wrinkle of the filter cloth and catching of the driving chain between the filter plates can be prevented. And, since the drive wheel is free with respect to the filter plate, a driving chain wound drive wheel can freely be slid on a driving shaft, at the opening or closing of the filter plates. Thus, resistance is not generated at the time. Further, at the lifting or lowering of the filter cloth, the drive wheel is slid in a direction where a load is small, whereby a load which is generated at the lifting or lowering of the filter cloth, can be reduced.

INDUSTRIAL APPLICABILITY

As described above, the filter suspending apparatus according to the present invention is suitable for a suspending apparatus which is used for a filter press. The filter press is used for the sewage treatment and the industrial waste water treatment or the like.

We claim:

1. In a filter press having plurality of vertically disposed filter plates (3) supported in parallel between a a pair of horizontal guide rails (2), means to shift the plates (3) to one of an open and a closed position relative to each other along said guide rails, a filter cloth (12) disposed between adjacent filter plates (3), the filter cloth (12) having upper and lower edges and an intermediate portion extending between said upper and lower edges, a drive wheel (11) mounted above each of the filter plates (3) to upper ends of the filter plates, a driving means (15) having first and second ends and an intermediate portion extending between said first and second ends, wherein the intermediate portion of the drive means is wound around an upper half of the drive wheel (11), the filter cloth (12) having its upper edge connected to the first end of the driving means (15), a guide roll (14) connected to a lower end of the filter plate, wherein the intermediate portion of the filter cloth extends around a lower half of the guide roll, wherein the lower edge of the filter cloth (12) is attached to the second end of the driving means (15) and is positioned above the guide roll, wherein the driving means (15) is adapted to raise and lower the filter cloth (12), wherein the improvement comprises a filter cloth suspending apparatus comprising:

an upper supporting bar (13), the supporting bar (13) being attached to the upper edge of the filter cloth (12), the first end of the driving means (15) being connected to the supporting bar (13), the filter cloth (12) having side edges connected to the lower edge of the filter cloth, the lower edge of the filter cloth (12) being cut out to form a central concave portion and lower corners at the side edges, wherein the upper edge and the corners at the lower edge of the filter cloth (12) are connected to the driving means;

a guide bar (26) attached to the filter plate (3) adjacent each of the side edges of the filter cloth (12); and a pair of tension rings (29), each said tension ring (29) freely encircling a respective one of the guide bars (26), each of the lower corners of the filter cloth (12) being secured to a respective tension ring (29).

2. In a filter press having a longitudinal array of vertically extending filter plates (3), a support frame (1,2) for longitudinally shiftably supporting the filter plates (3) along a horizontal span of the frame, a first drive means (5, 6, 7, 8) for longitudinally shifting the filter plates (3) along the horizontal span of the frame, wherein an adjacent pair of filter plates (3) achieve one of an open and a closed position relative to each other, a pair of filter cloth sheets (12) interposed between adjacent pairs of the filter plates (3), each of the sheets (12) having an upper and a lower edge guide means (14) for guiding part of a a said pair of filter cloth sheets (12) in reversible directions, wherein the improvement comprises a filter cloth suspending structure comprising:

a longitudinally extending shaft member (9) supported by the frame above said filter plates;

second drive means (10) for rotating the shaft member (9);

a sprocket member (11) longitudinally slidably fitted on the shaft member (9), the sprocket member (11) comprising a boss (11a) attached to one face thereof, said boss defining a radially outer cylindrical bearing surface extending coaxially about said shaft member;

suspension means (15, 17, 20, 26, 29) for suspending the sheets of filter cloth (12) from the sprocket member (11), whereby the upper and lower edges of the sheet of filter cloth (12) ascend and descend as the shaft member (9) is rotated by the second drive means (10) while the respective pair of adjacent filter plates (3) are in the open position; and support means (27, 28, 30) attached to one of the respective pair of adjacent filter plates (3) for supporting the sprocket member (11) with respect to the shaft member (9), the support means comprising a channel member (27a) having an open top, a closed bottom, and a pair of laterally spaced sides extending upwardly from said closed bottom, the channel member further comprising a seat (28) on the bottom thereof for bearing against the cylindrical bearing surface of the boss (11a) of the sprocket member (11) and a pair of horizontal guide pins (30) projecting inwardly from the respective said sides of the channel member (27a) for freely bearing against the cylindrical bearing surface of the boss (11a) held therebetween.

3. The filter press according to claim 2, wherein the lower edge of the sheet of filter cloth (12) is cut out to form a central concave portion;

a chain member (15) having first and second ends and an intermediate portion extending between said first and second ends, wherein the intermediate portion of the chain member is wound around an upper portion of the sprocket member (11), the first end of the chain member (15) being attached to the upper edge of the sheet of filter cloth (12), a pair of bag portions (18) formed one on each side of the central concave portion; and a pair of triangular suspending members (20) wherein each of bag portions (18) receives one of said triangular suspending members, and wherein one of said triangular suspending members is connected to the second end of the chain member (15).

4. The filter press according to claim 2, further comprising a pair of guide bar members (26), one each of the pair being attached to each side edge of the one adjacent filter plate (3), and a pair of ring members (29), each of the ring members (29) freely encircling a respective one of the pair of guide bar members (26), each of the ring members (29) being secured to a side of the lower edge of the sheet of filter cloth (12).

* * * * *

UNITED STATES PATENT AND TRADEMARK OFFICE
CERTIFICATE OF CORRECTION

PATENT NO. : 5,741,418
DATED : April 21, 1998
INVENTOR(S) : Iwatani, et. al.

It is certified that error appears in the above-identified patent and that said Letters Patent is hereby corrected as shown below:

On the Cover Page at [56]:

In References Cited, Foreign Patent Documents, page 1, column 2, reference "39904" should be --39604--.

Column 1, line 34, "No. Sho.-58-45842" should be --No. Sho.-56-45642--.

Column 2, line 7, "No. Sho.-58-45642" should be --No. Sho.-56-45642--.

Column 4, line 39, "i and 1" should be --1 and 1--.

Column 5, line 61, "FIG. 8" should be --FIG. 6--.

Column 6, line 8, "28" should be --26--.

Column 6, line 10, "28" should be --26--.

Column 6, line 13, "28" should be --26--.

Column 7, line 50, "a a" should be --a--.

Column 7, lines 56-57, "above each of the" should be --above the--.

Signed and Sealed this

Twenty-fourth Day of August, 1999

*Attest:*

Q. TODD DICKINSON

*Attesting Officer*     *Acting Commissioner of Patents and Trademarks*